United States Patent Office 3,223,755
Patented Dec. 14, 1965

3,223,755
PROCESS FOR THE BROMINATION OF
ALLYL ESTERS
Robert W. Rimmer, Pennsville, N.J., assignor to E. I. du
Pont de Nemours and Company, Wilmington, Del., a
corporation of Delaware
No Drawing. Filed June 15, 1962, Ser. No. 202,662
9 Claims. (Cl. 260—986)

This invention relates to a process for the addition bromination of allyl esters, and particularly to an improved process which provides higher yields of brominated products of improved quality and suppresses the production of undesired by-products.

2,3-dibromopropyl esters of phosphoric, pyrophosphoric and 2,3-dibromopropylphosphonic acids are flame retarding agents for plastics, fibers, resins, and lacquers. They are highly compatible, for example, with polyacrylonitrile and are soluble in aromatic, halogenated aromatic, and halogenated aliphatic solvents. Also, the 2,3-dibromopropyl esters of hydrocarbon carboxylic acids, particularly the esters of the lower alkanoic acids, are flame retardant agents.

A difficulty in the manufacture of essentially pure compounds by the liquid phase bromination of allyl alcohol and its above-named esters has been the formation in side reactions of troublesome by-products. These by-products not only reduce the yield of usable material, but they require additional processing steps for their removal. Furthermore, some of the by-products are extremely difficult to separate from the main product and their presence impairs the quality of the product. The principal impurities are 1,2,3-tribromopropane and acid-forming materials. In brominating allyl phosphorus compounds, additional impurities are organic phosphorus acids and polymeric derivatives of partially brominated triallyl phosphate, tetraallyl pyrophosphate, or diallyl allyl-phosphonate. The tribromopropane and the acid constituents may be readily removed by taking extra steps in the manufacturing operation, but the polymeric material remains intimately associated with the main product, is difficult to remove, and adversely affects the properties of the product. For instance, whereas pure tris(2,3-dibromopropyl) phosphate has a vscosity of 9,500 centipoises at 27° C., a molecular weight of 698, and bromine content of 68.8%, the purified product obtained by unaided bromination has a viscosity of 30,000 to 40,000 centipoises, a molecular weight of 800±50, and a bromine content of 66% to 67%; and the yield of such a product is only 65% to 80%.

It is an object of this invention to provide an improved process for the addition bromination of certain allyl esters. Another object is to provide a process by which brominated allyl esters of improved quality are obtained in high yields. A further object is to provide such a process which employs agents that suppress side reactions and the production of troublesome by-products, whereby the brominated esters are obtained in a materially purer condition. Still further objects are to improve the art. Still other objects will appear hereinafter.

The above and other objects of this invention may be accomplished by the addition bromination of allyl esters which comprises (a) Brominating a neutral allyl ester of an acid of the group consisting of hydrocarbon carboxylic acids, phosphoric acid, pyrophosphoric acid, and allylphosphonic acid, (b) At a temperature of about −20° C. to 100° C., (c) With about 1 mol of elemental bromine for each ethylenic unsaturation in each mol of the allyl ester, (d) In the presence of about 1% to about 50% by weight, based on the allyl ester, of a metal halide of a metal of the group consisting of Li, Be, Mg, Ca, Zn, Sr, Cd and Ba in which the halogen has an atomic number of 17–35, (e) In about 50% to about 500% by volume, based on the allyl ester, of a liquid, inert, non-polar organic solvent having a normal boiling point in the range of about −20° C. to about 185° C.

It has been found that, by operating the process in the manner above defined, the disadvantages of the prior processes are largely overcome. The metal halides of the specified class suppress side reactions and the formation of troublesome by-products and impurities, and promote the desired reaction so as to materially increase the yields of the desired brominated esters. The yield of desired brominated esters usually exceeds 90%, and the yield of by-product tribromopropane is usually less than 0.5%. In many cases, the products are sufficiently pure so that they are usable as produced without refinement by distillation, such as the 2,3-dibromopropyl esters of the lower alkanoic acids ($C_1$–$C_4$). The other 2,3-dibromopropyl esters, produced by the process of this invention, usually are of such high molecular weight that distillation is precluded as a practical refining procedure. Such higher molecular weight products as obtained are of greatly improved quality, having a higher bromine content and a lower molecular weight and a much lower viscosity. Also, this invention provides a simple one-vessel process of high volume output.

The allyl esters, which are to be brominated by the process of this invention, are the neutral allyl esters of hydrocarbon carboxylic acid, phosphoric acid, pyrophosphoric acid, and allylphosphonic acid. The hydrocarbon carboxylic acids include saturated and unsaturated aliphatic hydrocarbon carboxylic acids, cycloaliphatic hydrocarbon carboxylic acids, and aromatic hydrocarbon carboxylic acids, and may contain one, two, or more carboxyl groups. When the allyl esters of unsaturated aliphatic hydrocarbon carboxylic acids are brominated, allyl 10-undecenoate for instance, bromine adds to the double bond of the acid chain as well as to the double bond of the allyl group. Likewise, when the allyl ester of allylphosphonic acid is brominated by the process of this invention, the double bond of the allyl group in the allylphosphonic acid is also brominated. Of the allyl esters of the hydrocarbon carboxylic acids, it will generally be preferred to employ the esters of the (saturated) alkanoic acids, and particulary of the lower alkanoic acids which contain 1–4 carbon atoms. A commercial grade, as well as a highly refined, allyl ester may be used in the process of this invention.

Representative allyl esters which may advantageously be brominated according to the invention process are:

Allyl formate
Allyl acetate
Allyl propionate
Allyl valerate
Allyl hexanoate
Allyl 10-undecenoate
Allyl laurate
Allyl stearate
Diallyl oxalate
Diallyl malonate
Diallyl maleate,
Diallyl succinate
Diallyl sebacate
Diallyl phthalate
Diallyl isophthalate
Diallyl terephthalate
Allyl 2-naphthoate Triallyl phosphate, $(RO)_3\overset{O}{\underset{\|}{P}}$

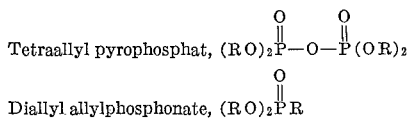

Tetraallyl pyrophosphat, $(RO)_2\overset{\overset{O}{\|}}{P}-O-\overset{\overset{O}{\|}}{P}(OR)_2$ Diallyl allylphosphonate, $(RO)_2\overset{\overset{O}{\|}}{P}R$ This invention is particularly adapted to the addition bromination of triallyl phosphate and diallyl allylphosphonate, and the bromination of such esters constitute the preferred embodiments of this invention.

The brominating agent is elemental bromine, usually a commercial grade of liquid bromine having a purity of about 99.5%. The bromine will be used in a proportion of about 1 mol for each ethylenic unsaturation in each mol of the allyl ester. For example, there will be employed about 1 mol of bromine for each mol of allyl acetate and about 3 mols of bromine for each mol of triallyl phosphate and each mol of diallyl allylphosphonate.

The bromination process of this invention may be carried out at temperatures of from about −20° C. to 100° C. Below −20° C., the reaction becomes excessively slow; and above 100° C., the formation of tribromopropane as a by-product increases to such an extent that the effect of the metal halide promoter in suppressing the formation of such by-products is lost. In general, temperatures above about 30° C. should be avoided as the effect of the promoter is diminished as the temperature is increased above 30° C., although the promoter will show a distinctly improved effect on the reaction at temperatures of 30° C.–100° C. Usually, the process will be carried out at temperatures of from about −10° C. to about 30° C., and preferably from about 5° C. to about 25° C.

For obtaining the advantages of this invention, it is essential that the reaction take place in the presence of a metal halide of a metal of the group consisting of Li, Be, Mg, Ca, Zn, Sr, Cd and Ba, in which halide the halogen has an atomic number of 17–35, that is, is bromine or chlorine. Such halides may be anhydrous or hydrated halides. Mixtures of two or more of such metal halides may be used. Preferably, the metal bromides will be used, and particularly calcium bromide dihydrate, $CaBr_2 \cdot 2H_2O$.

The metal halides that will be used as promoters for the bromination of the allyl esters include $LiBr$, $LiCl$, $LiCl \cdot H_2O$, $BeBr_2$, $BeCl_2$, $BeCl_2 \cdot 4H_2O$, $CaBr_2$,

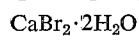

$CaBr_2 \cdot 2H_2O$ $CaBr_2 \cdot 3H_2O$, $CaCl_2$, $CaCl_2 \cdot 2H_2O$, $CaCl_2 \cdot 6H_2O$, $MgBr_2$, $CaBr_2 \cdot 6H_2O$, $MgBr_2 \cdot 6H_2O$, $MgCl_2$, $MgCl_2 \cdot 6H_2O$, $SrCl_2$, $SrCl_2 \cdot 2H_2O$, $SrCl_2 \cdot 6H_2O$, $SrBr_2$, $SrBr_2 \cdot 6H_2O$, $BaBr_2$, $BaBr_2 \cdot 2H_2O$, $BaCl_2$, $BaCl_2 \cdot 2H_2O$, $ZnBr_2$, $ZnCl_2$, $CdBr_2$, $CdBr_2 \cdot 4H_2O$, $CdCl_2$, $CdCl_2 \cdot 2.5H_2O$. A mixture of an anhydrous and a hydrated salt or a partially dehydrated hydrate of one of the selected metal chlorides or bromides may also be employed.

The results obtained are specific to the bromides and chlorides of the recited metals. Halides of metals such as copper, iron, sodium, potassium, rubidium, and cesium are ineffective to produce the advantages of this invention. Also, steps (involved in the isolation procedure following the bromination) include washing the reaction mass with water, withdrawing the aqueous layer, and then removing the solvent from organic layer by stripping, the purpose of the washing being to wash out excess bromine and acids. When it was attempted to employ $TiCl_4$, $AlCl_3$, and the like in the process of this invention, it was found that they formed oxides by reaction with the wash water which oxides stabilize emulsions of the ester-water mixtures and rendered it extremely difficult to isolate the brominated ester.

The metal halide should be employed in a concentration of from about 1% to about 50% by weight based on the allyl ester. An amount materially less than about 1% generally will have little discernible effect and not have practical value, while amounts up to 50% and above will be found to promote the desired bromination with high effectiveness, but amounts materially above 50% usually will be uneconomical and require the use of excessively large volumes of solvent. The preferred amount of the metal halide will vary with the allyl ester, the metal halide, and the reaction conditions, e.g., the amount of solvent present and the temperature. Usually, the metal halide will be used in a concentration of from about 3% to about 10% by weight based on the allyl ester. The preferred amount of calcium bromide dihydrate for the bromination of triallyl phosphate is from about 4% to about 5% by weight. Calcium chloride and calcium bromide are more effective than zinc chloride and zinc bromide, respectively, in promoting the bromination of the allyl etsers. With the lower amounts of solvent and at the higher reaction temperatures (i.e. 50° C. to 100° C.), more metal halide is required than with the larger amounts of solvent and at the lower operating temperatures.

The metal bromide may be formed in situ by starting the bromination with the metal in the form of its oxide, carbonate, or hydroxide, which will be converted to the metal bromide during the process. The beneficial effect so obtained is more apparent in those brominations which can be conducted satisfactorily with relatively low concentrations of the metal bromide, that is, with the larger amounts of solvent and lower temperatures and particularly with the allyl esters of the acids of phosphorus, e.g., triallyl phosphate, than in brominations for which larger amounts of the promoter are needed for optimum results.

Solvents are generally employed in the new bromination process to increase the fluidity of the reaction mass for working at preferred lower temperatures than otherwise are possible and for improving the heat transfer through the reaction medium. The bromination is an exothermic reaction, and heat must be removed to hold the temperature at a constant level. In the absence of a solvent, in brominating triallyl phosphate for example, the reaction temperature must be raised to reduce the viscosity of the reaction mass for adequate agitation and proper heat transfer and, as the reaction temperature is raised, the yield of product tends to decrease and the quality of the product may be impaired. A solvent suitable for use in the process is a liquid, inert, non-polar organic solvent which has a normal boiling point in the range of about −20° C. to about 185° C., usually about 60° C. to about 130° C. Polar solvents, having such groups as hydroxyl, thiol, carboxy, carbonyl, formyl, amino, alkylamino (—NHR) and the like, which react with or cause the solvent containing them to react with bromine or with intermediates in the bromination reaction, are excluded. In general, it will be preferable to employ a solvent which is liquid at atmospheric pressure at the prevailing reaction temperature to avoid the use of pressure equipment, and also to employ a solvent which does not have an excessively high boiling point and can be easily removed when required. However, solvents, having normal boiling points below the reaction temperature employed, can be used under elevated pressures sufficient to maintain them in the liquid state. Solvents which may be used to provide the advantages of this invention without adverse effect include aromatic hydrocarbons such as benzene, toluene, xylene; halogenated aromatic hydrocarbons such as chlorobenzene, dichlorobenzenes, monobromobenzene, chlorotoluene, bromotoluene; and halogenated alkanes, such as chloroform, carbon tetrachloride, 1,2-difluorotetrachloroethane. Mixtures of these solvents may also be used.

The solvent will be employed in a proportion of from about 50% to about 500% by volume based on the allyl ester, preferably from about 100% to about 200% by volume.

The general procedure for conducting the novel process of this invention is relatively simple. A reaction vessel may be charged with the allyl ester, the solvent, and the metal halide promoter, and the bromine gradually added thereto, usually under nitrogen, while the temperature of the reaction mass is held within the desired range. Usually, it will be desirable to add the allyl ester and the bromine simultaneously to the solvent containing the metal halide. Preferably, a minor proportion of the allyl ester is charged to the reactor with the solvent and the metal halide to aid the solution of the metal halide, and then the balance of the allyl ester is fed gradually into the reactor simultaneously with the bromine.

Also, the process may be operated continuously, that is, by feeding the allyl ester and the bromine continuously, for example, to a stream of solvent containing the metal halide promoter and some of the allyl ester, maintained at the desired temperature, and continuously withdrawing the reaction mixture. An alternate procedure to further illustrate a continuous process is to feed the allyl ester containing the metal halide to a solvent stream containing the bromine, and continuously withdrawing the reaction mixture.

Usually, it is desirable to avoid contamination of the reaction mixture with ammonia, acidic fumes and excess moisture which may be present in the atmosphere from other nearby operations. Therefore, it is usually preferred to carry out the reaction under a blanket of nitrogen. However, air, if dry, and pure, can be used as the the atmosphere.

In order to more clearly illustrate this invention, preferred modes of carrying it into effect, and the advantageous results to be obtained thereby, the following examples are given in which the parts and proportions are by weight, except where specifically indicated otherwise.

*Example 1.—Bromination of allyl acetate*

A glass-lined reaction vessel was charged with 150 parts of allyl acetate, 384 parts of carbon tetrachloride, and 15 parts of calcium bromide dihydrate, and the mixture was cooled to 0° C. and blanketed with nitrogen. To the mixture was added 240 parts of bromine at a rate to keep the temperature of the reaction mass between 0° C. and 10° C. After standing one hour, the excess bromine in the reaction mass was destroyed with 5% aqueous sodium bisulfite solution, and the mixutre was washed with water and sodium bicarbonate solution. The solvent was removed by stripping at 2 mm. Hg pressure to a pot temperature of 100° C. Three hundred sixty-one parts or 93% yield of solvent-free product which was essentially 2,3-dibromopropyl acetate remained. Calculated: Br=61.6%. Found: 62.5%.

The above reaction was repeated in the absence of the calcium bromide dihydrate to produce 327 parts or 84.2% yield of 2,3-dibromopropyl acetate. The bromine content of this product was 62.0%.

*Example 2.—Bromination of triallyl phosphate*

The reaction vessel of Example 1 was charged with 200 parts of carbon tetrachloride, 17 parts of triallyl phosphate, and 12 parts of calcium bromide dihydrate, and the mixture was cooled to 10° C., and placed under nitrogen. To the mixture was then added simultaneously 110 parts of triallyl phosphate and 269 parts of bromine while the temperature was held at 10±2° C. The reaction mass was washed in turn with 5% aqueous sodium bisulfite solution, 5% aqueous sodium bicarbonate solution, and water, and the solvent was removed by vacuum stripping. No tribromopropane was present.

The residue, which was essentially tris(2,3-dibromopropyl) phosphate, amounted to 369 parts or 94% of the theoretical amount. It had a bromine content of 68.3% vs. a calculated value of 68.8%, and a molecular weight as determined by boiling point elevation in benzene of 716 vs. a calculated value of 698.

When the above procedure was repeated in the absence of the calcium bromide dihydrate, 12 parts or 3% of tribromopropane (identified by infrared spectroscopy) was recovered. The yield of tris(2,3-dibromopropyl) phosphate was 355 parts or 90%. The bromine content of the product was 67.3% and its molecular weight 744. The presence of the calcium bromide dihydrate in the foregoing bromination has materially suppressed the formation of tribromopropane and significantly increased the yield and quality of the desired product.

The above procedure with calcium bromide dihydrate was repeated except that the bromine and triallyl phosphate were simultaneously added to the reaction mass at a temperature of 75° C. to 80° C. There was obtained 9 parts or 2.3% of tribromopropane and 338 parts or 86.5% of tris(2,3-dibromopropyl) phosphate having a bromine content of 68.5% and a molecular weight of 724. At the higher reaction temperature, the yield is lowered, i.e., some tribromopropane is formed, but the tris(2,3-dibromopropyl) phosphate has a definitely better quality (as shown by its lower molecular weight and higher bromine content) than the product obtained in the absence of the calcium bromide dihydrate at the more favorable lower reaction temperature.

When the above procedure was followed with 160 parts of chlorobenzene used as the solvent in place of carbon tetrachloride, with 4.5 parts of calcium bromide dihydrate present as a bromination promoter, and the temperature of reaction held at $-10\pm2°$ C., no dibromopropane formed. The yield of tris(2,3-dibromopropyl) phosphate was 369 parts or 94% with a bromine content of 68.5% and a molecular weight of 707.

The use of 6 parts of calcium chloride ($CaCl_2$) in place of the 12 parts of calcium bromide dihydrate for the bromination at 10° C. to 20° C. by the above procedure, suppressed the formation of tribromopropane; none formed. The tris(2,3-dibromopropyl) phosphate amounted to 367 parts or 94% yield and had a bromine content of 67.6%, a chlorine content of 0.4%, and a molecular weight of 705. The chlorine results from the formation of 2% of tris(bromochloropropyl) phosphate.

*Example 3.—Bromination of triallyl phosphate*

A bromination was conducted by adding, at 15° C. under nitrogen, 269 parts of bromine to a mixture of 200 parts of carbon tetrachloride, 122 parts of triallyl phosphate, and 12 parts of lithium bromide, all of the triallyl phosphate being present in the reaction vessel at the outset. There was obtained 4 parts or 1% by weight of tribromopropane. The tris(2,3-dibromopropyl) phosphate amounted to 363 parts, equivalent to a 92.8% yield, and had a bromine content of 68.5% and a molecular weight of 716.

Under the same conditions but in the absence of the lithium bromide, as much as 25 parts or 6.3% of tribromopropane formed, and the yield of tris(2,3-dibromopropyl) phosphate was 265 parts or only 68%. The bromine content was 66.8% and the molecular weight of the brominated phosphate was 775.

When the following metal compounds were present during the bromination under the same conditions as above, an improved quality product in higher yields was obtained as shown in the table below.

| Bromination Promoter | Amt. in Parts (Per 122 Parts of Triallyl Phosphate) | Tris(2,3-dibromopropyl) Phosphate | | | Tribromopropane, percent |
|---|---|---|---|---|---|
| | | Yield, in percent | Percent Br | Molecular Weight | |
| None, control | | 76 | 66.8 | 775 | 6.3 |
| $MgBr_2 \cdot 6H_2O$ | 12 | 87.5 | 68.2 | 674 | 1.1 |
| CaO | 6 | 91.6 | | 728 | <0.3 |
| $CaBr_2$ | 5 | } 94.7 | | | <0.25 |
| CaO | 0.53 | | | | |
| $CdCl_2$ | 12 | 82.1 | | | 2.6 |

*Example 4.—Bromination of diallyl allylphosphonate*

A glass-lined reaction vessel was charged with 81 parts of diallyl allylphosphonate, 160 parts of carbon tetrachloride, and 8 parts of calcium bromide dihydrate. The mixture was cooled to 10° C. and blanketed with nitrogen. With the temperature held at 10±2° C., 192 parts of bromine was added over a period of about an hour, and the mass was agitated for an additional hour. After the charge was washed in the usual way and the solvent removed by distillation, only 0.4% of tribromopropane was recovered. Bis(2,3-dibromopropyl) 2,3-dibromopropylphosphonate,

having a viscosity of 14,250 centipoises at 27° C. was obtained in a yield of 88%.

A similar bromination, done in the absence of the calcium bromide dihydrate, produced 8.4% of tribromopropane, and a 77% yield of brominated phosphonate ester having a viscosity of over 50,000 centipoises at 27° C. The bromine content of the ester was 66.9% vs. a calculated value of 70.4%.

It will be understood that the preceding examples have been given for illustrative purposes solely and that this invention is not limited to the specific embodiments described therein. On the other hand, it will be readily apparent to those skilled in the art that, subject to the limitations set forth in the general description, many variations can be made in the materials, proportions, and conditions employed, without departing from the spirit and scope of this invention.

From the foregoing description, it will be apparent that this invention provides a novel and improved process for the addition bromination of the allyl esters of the defined class, which results in higher yields of the desired brominated esters of improved purity and quality. Such process overcomes the difficulties of the prior art processes and particularly suppresses side reactions and the formation of troublesome by-products and, particularly with the allyl esters of the acids of phosphorus, avoids the production of products of excessively high viscosity and molecular weight. The process is simple and readily carried out in a single vessel with a high volume output. Accordingly, it will be apparent that this invention constitutes a valuable advance in and contribution to the art.

The embodiments of the invention in which an exclusive property or privilege is claimed are defined as follows:

1. The process for the addition bromination of an allyl ester which comprises
   (a) brominating a neutral allyl ester of an acid of the group consisting of an alkanoic carboxylic acid of 1 to 4 carbon atoms, phosphoric acid, pyrophosphoric acid, and allylphosphonic acid,
   (b) at a temperature of about —20° C. to 100° C.,
   (c) with about 1 mol of elemental bromine for each ethylenic unsaturation in each mol of the allyl ester,
   (d) in the presence of about 1% to about 50% by weight, based on the allyl ester, of a metal halide of a metal of the group consisting of Li, Be, Mg, Ca, Zn, Sr, Cd and Ba in which the halogen has an atomic number of 17–35,
   (e) in about 50% to about 500% by volume, based on the allyl ester, of a liquid, inert, non-polar organic solvent having a normal boiling point in the range of about —20° C. to about 185° C.

2. The process for the addition bromination of an allyl ester which comprises
   (a) brominating triallyl phosphate,
   (b) at a temperature of about —10° C. to about 25° C.,
   (c) with about 3 mols of elemental bromine for each mol of the triallyl phosphate,
   (d) in the presence of about 1% to about 50% by weight, based on the triallyl phosphate, of a metal halide of a metal of the group consisting of Li, Be, Mg, Ca, Zn, Sr, Cd and Ba in which the halogen has an atomic number of 17–35,
   (e) in about 50% to about 500% by volume, based on the triallyl phosphate, of a liquid, inert, non-polar organic solvent having a normal boiling point in the range of about —20° C. to about 185° C.

3. The process for the addition bromination of an allyl ester which comprises
   (a) brominating triallyl phosphate,
   (b) at a temperature of about 5° C. to about 25° C.,
   (c) with about 3 mols of elemental bromine for each mol of the triallyl phosphate,
   (d) in the presence of about 3% to about 10% by weight of calcium bromide dihydrate based on the triallyl phosphate,
   (e) in about 100% to about 200% by volume, based on the triallyl phosphate, of a liquid, inert, non-polar organic solvent having a normal boiling point in the range of about 60° C. to about 130° C.

4. The process for the addition bromination of an allyl ester which comprises
   (a) brominating diallyl allylphosphonate,
   (b) at a temperature of about —10° C. to about 25° C.,
   (c) with about 3 mols of elemental bromine for each mol of the diallyl allylphosphonate,
   (d) in the presence of about 1% to about 50% by weight, based on the diallyl allylphosphonate, of a metal halide of a metal of the group consisting of Li, Be, Mg, Ca, Zn, Sr, Cd and Ba in which the halogen has an atomic number of 17–35,
   (e) in about 50% to about 500% by volume, based on the diallyl allylphosphonate, of a liquid, inert, non-polar organic solvent having a normal boiling point in the range of about —20° C. to about 185° C.

5. The process for the addition bromination of an allyl ester which comprises
   (a) brominating diallyl allylphosphonate,
   (b) at a temperature of about 5° C. to about 25° C.,
   (c) with about 3 mols of elemental bromine for each mol of the diallyl allylphosphonate,
   (d) in the presence of about 3% to about 10% by weight of calcium bromide dihydrate based on the diallyl allylphosphonate,
   (e) in about 100% to about 200% by volume, based on the diallyl allylphosphonate, of a liquid, inert, non-polar organic solvent having a normal boiling point in the range of about 60° C. to about 130° C.

6. The process for the addition bromination of an allyl ester which comprises
   (a) brominating a neutral allyl ester of an alkanoic carboxylic acid of 1 to 4 carbon atoms,
   (b) at a temperature of about —10° C. to about 25° C.,
   (c) with about 1 mol of elemental bromine for each mol of the allyl ester,
   (d) in the presence of about 3% to about 10% by weight, based on the allyl ester, of a metal halide of a metal of the group consisting of Li, Be, Mg, Ca, Zn, Sr, Cd and Ba in which the halogen has an atomic number of 17–35,
   (e) in about 50% to about 500% by volume, based on the allyl ester, of a liquid, inert, non-polar organic solvent having a normal boiling point in the range of about 60° C. to about 185° C.

7. The process for the addition bromination of an allyl ester which comprises
   (a) brominating a neutral allyl ester of an alkanoic carboxylic acid of 1 to 4 carbon atoms, (b) at a temperature of about 5° C. to about 25° C.,
(c) with about 1 mol of elemental bromine for each mol of the allyl ester,
(d) in the presence of about 3% to about 10% by weight, based on the allyl ester, of calcium bromide dihydrate,
(e) in about 50% to about 500% by volume, based on the allyl ester, of a liquid, inert, non-polar organic solvent having a normal boiling point in the range of about 60° C. to about 130° C.

8. The process for the addition bromination of an allyl ester which comprises
(a) brominating allyl acetate,
(b) at a temperature of about −10° C., to about 25° C.,
(c) with about 1 mol of elemental bromine for each mol of the allyl acetate,
(d) in the presence of about 1% to about 50% by weight, based on the allyl acetate, of a metal halide of a metal of the group consisting of Li, Be, Mg, Ca, Zn, Sr, Cd and Ba in which the halogen has an atomic number of 17–35,
(e) in about 50% to about 500% by volume, based on the allyl acetate, of a liquid, inert, non-polar organic solvent having a normal boiling point in the range of about −20° C. to about 185° C.

9. The process for the addition bromination of an allyl ester which comprises
(a) brominating allyl acetate,
(b) at a temperature of about 5° C. to about 25° C.,
(c) with about 1 mol of elemental bromine for each mol of the allyl acetate,
(d) in the presence of about 3% to about 10% by weight of calcium bromide dihydrate based on the allyl acetate,
(e) in about 100% to about 200% by volume, based on the allyl acetate, of a liquid, inert, non-polar organic solvent having a normal boiling point in the range of about 60° C. to about 130° C.

References Cited by the Examiner
UNITED STATES PATENTS

| | | | |
|---|---|---|---|
| 2,099,231 | 11/1937 | Ruys et al. | 260—662 |
| 2,574,515 | 11/1951 | Walter et al. | 260—461 |
| 3,027,296 | 3/1962 | Whetstone et al. | 260—461 |

CHARLES B. PARKER, *Primary Examiner.*

MORRIS LIEBMAN, IRVING MARCUS, *Examiners.*